(12) United States Patent
Kalscheur et al.

(10) Patent No.: US 12,017,184 B2
(45) Date of Patent: Jun. 25, 2024

(54) APPARATUS AND A METHOD FOR USING PERMEATE TO FLUSH A REVERSE OSMOSIS FILTER

(71) Applicant: Velocity Water Works LLC, Appleton, WI (US)

(72) Inventors: Paul Philip Kalscheur, Greenleaf, WI (US); Michael Aaron Huiting, Combined Locks, WI (US); Clint Jeffrey Griesbach, Greenville, WI (US); Theodore Paul LaVigne, Everett, WA (US); Jay Scott Dayak, Davenport, FL (US)

(73) Assignee: Sonny's Water Systems LLC, Tamarac, FL (US)

( * ) Notice: Subject to any disclaimer, the term of this patent is extended or adjusted under 35 U.S.C. 154(b) by 99 days.

(21) Appl. No.: 17/680,670

(22) Filed: Feb. 25, 2022

(65) Prior Publication Data

US 2022/0176323 A1 Jun. 9, 2022

Related U.S. Application Data

(62) Division of application No. 16/862,307, filed on Apr. 29, 2020, now Pat. No. 11,389,770.

(51) Int. Cl.
  *B01D 65/02* (2006.01)
  *B01D 61/02* (2006.01)
  (Continued)

(52) U.S. Cl.
  CPC ........... *B01D 65/02* (2013.01); *B01D 61/025* (2013.01); *B01D 61/08* (2013.01); *C02F 1/441* (2013.01);
  (Continued)

(58) Field of Classification Search
  None
  See application file for complete search history.

(56) References Cited

U.S. PATENT DOCUMENTS

| 3,992,301 A | 11/1976 | Shippey ................ B01D 61/30 |
| | | 210/636 |
| 7,316,774 B2 | 1/2008 | Halemba et al. |
| | (Continued) | |

FOREIGN PATENT DOCUMENTS

WO    WO2007/064831    6/2007

OTHER PUBLICATIONS

Jiang et al., A review of reverse osmosis membrane fouling and control strategies, Science of The Total Environment, vol. 595 (2017), p. 567-583, https://doi.org/10.1016/j.scitotenv.2017.03.235. (Year: 2017).*

(Continued)

*Primary Examiner* — Chester T Barry
(74) *Attorney, Agent, or Firm* — Laurence A. Greenberg; Werner H. Stemer; Ralph E. Locher

(57) ABSTRACT

An apparatus and a method use permeate to flush a reverse osmosis filter membrane in the same flow direction as when fluid is being filtered through the membrane. The apparatus includes a housing having a membrane positioned therein. The membrane has an interior surface and an exterior surface. The housing has an inlet port located outward of the exterior surface of the membrane and first and second outlet ports. The first outlet port is located outward of the exterior surface of the membrane and the second outlet port is located inward of the interior surface of the membrane. A first pump is used to route pressurized, untreated fluid from a fluid source through the membrane to produce permeate. A second pump is used to route permeate to a desired (Continued)

function while also routing some permeate at low pressure to the housing to flush the membrane.

14 Claims, 7 Drawing Sheets

(51) Int. Cl.
*B01D 61/08* (2006.01)
*C02F 1/44* (2023.01)

(52) U.S. Cl.
CPC .... *B01D 2313/18* (2013.01); *B01D 2313/243* (2013.01); *B01D 2321/02* (2013.01); *B01D 2321/12* (2013.01); *C02F 2303/16* (2013.01)

(56) References Cited

U.S. PATENT DOCUMENTS

| | | |
|---|---|---|
| 8,206,581 B2 | 6/2012 | Richetti |
| 8,323,484 B2 | 12/2012 | Kung et al. |
| 8,691,095 B2 | 4/2014 | Hooley et al. |
| 2009/0194478 A1 | 8/2009 | Saveliev et al. |
| 2017/0203979 A1 | 7/2017 | Tarquin ................. B01D 61/04 |
| 2018/0002198 A1 | 1/2018 | Lane et al. |
| 2020/0047126 A1* | 2/2020 | Peichel ................ B01D 61/027 |

OTHER PUBLICATIONS

How Reverse Osmosis Flush Valves Work. [online], [retrieved from purewateroccasional website on Dec. 18, 2019]. Retrieved from the Internet: http:/www.purewateroccasional.net/hwautoflush.html, 4 pgs.
Permeate Flush System Upgrades & Membrane Cleaning System Replacement. [retrieved from Globaltech website on Dec. 18, 2019]. Retrieved from the Internet: upgrades/, 4 pgs.

* cited by examiner

APPARATUS AND A METHOD FOR USING PERMEATE TO FLUSH A REVERSE OSMOSIS FILTER

CROSS-REFERENCE TO RELATED APPLICATION

This is a divisional application of U.S. patent application Ser. No. 16/862,307, filed Apr. 29, 2020, now U.S. Pat. No. 11,389,770. The prior application is herewith incorporated by reference in its entirety.

FIELD AND BACKGROUND OF THE INVENTION

This invention relates to an apparatus and a method for using permeate (mineral free fluid) to flush a reverse osmosis filter in the same direction of flow as when untreated fluid is being filtered through the membrane.

Traditional 'reverse osmosis' filtering systems are designed to remove dissolved solids (minerals) from incoming untreated fluid (water). A typical reverse osmosis filtering system utilizes a pump to pressurize the incoming untreated fluid to a level that compresses the semi-permeable membrane of the reverse osmosis filter to a level that allows only filter fluid, free of minerals, to pass through. This filtered, mineral free fluid is commonly referred to as "permeate". The permeate is then utilized for its intended purpose, such as clean fluid for use in a car wash, or in some other commercial or industrial application. Alternatively, the permeate could be routed to a storage tank for subsequent use. The dissolved solids that did not pass through the reverse osmosis filter membrane are trapped in and on the membrane for removal later during a flush process. The filtering process will continue until the reverse osmosis filter membrane reaches a capacity wherein it can no longer store the dissolved solids, and therefore becomes inefficient in its ability to filter the incoming untreated fluid. The reverse osmosis filtering system must then be flushed to remove the stored dissolved solids.

The reverse osmosis filter membrane can be flushed in the same direction as fluid flow during the filtering process or in a reverse direction. Some flushing processes use untreated fluid to flush the reverse osmosis filter membrane while others use permeate fluid. In a reverse osmosis filtering system, which uses the untreated fluid to flush the membrane, the same pump is normally used that circulates the fluid during the filtering process. The difference being that a control valve now vents some of the untreated fluid to a discharge drain thereby preventing the pressure from building up against the membrane. The lower pressure allows the membrane to relax such that its pores will open, and the incoming untreated water can flow freely. The increase water flow through the relaxed membrane will release the trapped dissolved solids (minerals) from the membrane for discharge to a drain.

After a period of time, the flushing is ended by turning off the pump and shifting the valve back to its original position. The untreated fluid can once again be filtered by flowing through the cleaned membrane.

One disadvantage with the above-described, same direction of flow, flushing process is that the untreated fluid used to flush the membrane is high in trapped dissolved solids (minerals). This means that the amount of untreated fluid left in the membrane, once the flushing process stops, contains a high concentration of dissolved solids (minerals) which will again try to attach themselves to the membrane. Second, some of the untreated fluid that has passed through the membrane will contaminate the storage tank once the filtering process resumes. Third, although the above-described flushing process does remove heavy and loose solids from the membrane, it is ineffective in removing trapped solids which have accumulated within the membrane. Such trapped solids are commonly referred to as "plating" and are caused by orthophosphates in the water supply.

U.S. Pat. No. 8,323,484 B2 issued to Kung et al. teaches a flush in the same direction as the filtering process but uses a very small flush reservoir dimensioned to hold up to about one liter of permeate. The Kung et al. patent is designed for a residential faucet and therefore utilizes a very small flush reservoir. Furthermore, Kung et al. does not utilize a pump to route permeate through the membrane. Published Patent Application WO 2007/064831 A1 to Mason et al. teaches a reverse flow method or "back flush" of the flushing fluid through the membrane. This process is 180 degrees opposite to the present invention.

SUMMARY OF THE INVENTION

Now, an apparatus and a method have been invented for using permeate (mineral free fluid, such as water) to flush trapped solids from a semi-permeable membrane in a reverse osmosis filter. The apparatus and method utilize the same direction of fluid flow during the flushing process as during the filtering process and includes "resorption" and a "resorption flush" to enhance the effectiveness of the flushing operation.

Briefly, this invention relates to an apparatus and a method for using permeate to flush a reverse osmosis filter in the same direction of flow as when untreated fluid is being filtered through the membrane.

The apparatus for using permeate to flush a reverse osmosis filter membrane in the same flow direction as when the fluid is being filtered through the membrane includes a housing having a reverse osmosis filter membrane positioned therein. The housing has an inlet side and an outlet side. The membrane has an interior surface and an exterior surface. The housing has an inlet port located outward of the exterior surface of the membrane, at the inlet side of the housing, and a first outlet port and a second outlet port both located at the outlet side of the housing. The first outlet port is located outward of the exterior surface of the membrane and the second outlet port is located inward of the interior surface of the membrane. A first pump is used to pressurize the untreated fluid from a fluid source and route the untreated fluid to the inlet side of the housing and through the membrane. The fluid which passes through the membrane will be "permeate" (mineral free fluid).

The apparatus also includes a storage tank for holding permeate routed through the second outlet port of the housing. A second pump is used to route permeate from the storage tank to a desired function. The desired function could be any device requiring clean fluid, for example, car wash equipment. The second pump also routes permeate to the inlet side of the housing when the membrane is to be flushed and the first pump is turned off. A portion of permeate is passed adjacent to the exterior surface of the membrane to flush heavy and loose solids from the membrane through the first outlet port to a drain. The remaining portion of permeate is passed through the membrane to flush solids accumulated within the membrane. These solids are then passed through the first outlet port to the drain. Once the flushing operation is complete, the second pump is stopped to allow the permeate located within the housing to immerse the membrane and resorb solids from the membrane. This resorption cycle lasts for at least about 5 minutes. The second pump is then restarted and additional permeate is route to the housing to flush the resorption fluid out of the housing. The flushing cycle is now complete. The second pump can be turned off and the first pump can be turned on to again begin the filtering of untreated fluid.

A method of using permeate to flush a reverse osmosis filter membrane in the same direction of flow as when fluid is being filtered by the membrane is also taught. The method includes the steps of routing pressurized, untreated fluid through a housing having a reverse osmosis filter membrane positioned therein. The filtered fluid, known as "permeate" (mineral free fluid) is then routed to a storage tank. The flow of the untreated fluid through the housing is stopped and permeate from the storage tank is routed to the housing to flush the membrane. The flow of permeate is then stopped to allow the permeate present in the housing to immerse the membrane for at least about 5 minutes. This allows permeate to resorb solids from the membrane and further clean the membrane. Permeate containing the resorb solids forms a flush fluid. The permeate flow is again restarted to the housing in order to push the flush fluid out of the housing. Once the flush fluid has been expelled, the flow of permeate is stopped and the reverse osmosis filter membrane is again ready to start filtering additional untreated fluid.

The general object of this invention is to provide an apparatus and a method for using permeate (mineral free fluid, such as water) to flush a reverse osmosis filter membrane. A more specific object of this invention is to provide an apparatus and a method for using permeate to flush trapped solids from a semi-permeable membrane in a reverse osmosis filter membrane at low pressure.

Another object of this invention is to provide a cost effective and reliable way to flush a reverse osmosis filter membrane using permeate which is passed through the reverse osmosis filter membrane in the same direction as the flow of untreated fluid during the filtration process.

A further object of this invention is to utilize a first pump for supplying pressurized, untreated fluid to the reverse osmosis filter membrane, and using a second pump to supply low pressure permeate to flush the reverse osmosis filter membrane.

Still another object of this invention is to provide an apparatus and a method which can remove plating from the reverse osmosis filter membrane which is caused by orthophosphates in the fluid supply.

Still further, an object of this invention is to provide an apparatus and a method which can improve the efficiency of the reverse osmosis filter membrane and extend the life of the reverse osmosis filter membrane by providing a more complete cleaning.

Other objects and advantages of the present invention will become more apparent to those skilled in the art in view of the following description and the accompanying drawings

DETAILED DESCRIPTION OF THE INVENTION

Figure 1:
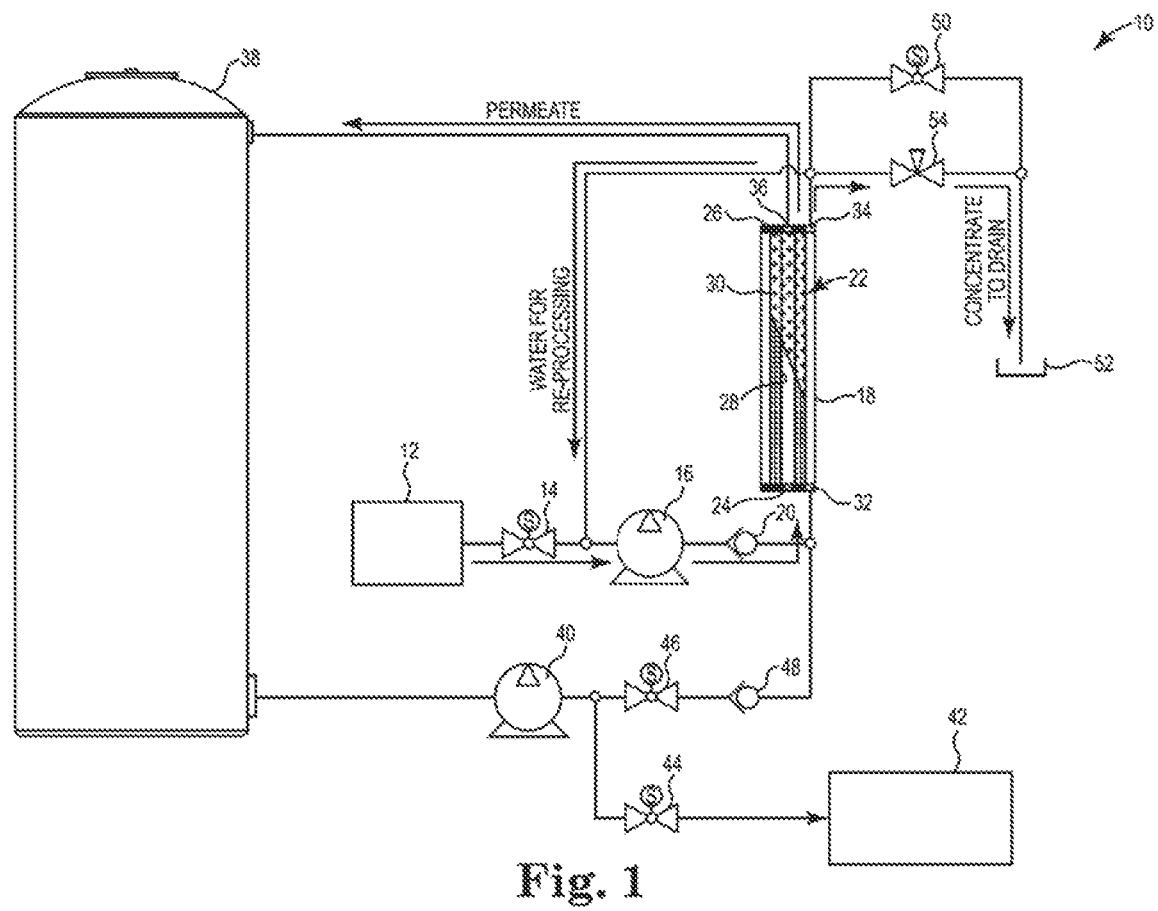
FIG. 1 is a schematic of an apparatus using a reverse osmosis filter membrane and showing the fluid flow during a filtering process.

Referring to FIG. 1, a filtering system 10 is depicted during a filtering cycle of untreated fluid from a fluid source 12. The filtering system 10 can be used in various processes, such as by a commercial car wash, by a green house, or in some other industrial or commercial application. The filtering system 10 uses permeate (mineral free fluid) to flush a reverse osmosis filter membrane in the same direction of flow as when the fluid is being filtered through the membrane. The filtering system 10 includes a fluid source 12. The fluid source 12 can be municipal fresh water supply or a private well. The fluid source 12 should be capable of supplying a large and consistent amount of fluid (water) over an extended period of time. When the fluid source 12 is a municipal water supply or a well, the water will typically contain one or more minerals that have naturally dissolved or were added when the fluid is initially treated. Natural, dissolved solids commonly found can include: iron, calcium, magnesium, zinc, potassium, sodium, bicarbonates, chlorides, and sulfates. Common additives that are usually added to the fluid are orthophosphates. Orthophosphates (reactive phosphorus) are commonly used in municipal water supplies to control the dissolving of lead into the water supply, and to slow the corrosion of steel water lines. Orthophosphates attach themselves to the inner walls of the pipes which resembles a platelet-like coating that resists corrosion. This incoming fluid (water) is generally referred to as untreated fluid.

The untreated fluid from the fluid source 12 is routed through a conduit having a first control valve 14 positioned across it. The first control valve 14 controls the amount of fluid which can flow through the conduit. The untreated fluid is directed from the first control valve 14 to a first pump 16. The first pump 16 is a high-pressure pump which can deliver the untreated fluid at a fixed pressure of at least about 100 pounds per square inch (psi). Desirably, the first pump 16 can deliver fluid at a fixed pressure ranging from about 100 psi to about 250 psi. More desirably, the first pump 16 can deliver fluid at a fixed pressure which ranges from between about 150 psi to about 225 psi. Even more desirably, the first pump 16 can deliver fluid at a fixed pressure which ranges from between about 160 psi to about 200 psi. Most desirably, the first pump 16 can deliver fluid at a fixed pressure which ranges from between about 175 psi to about 185 psi.

It should be noted that using a first pump 16 which can deliver the untreated fluid at a fixed pressure is more desirable than delivering the untreated fluid at a variable pressure.

The high-pressure fluid is directed from the first pump 16 through a conduit to a housing 18. A one-way check valve 20 is positioned across the conduit, downstream of the first pump 16, to prevent backflow of the pressurized untreated fluid.

The housing 18 contains a reverse osmosis filter membrane 22. Reverse osmosis is a fluid (water) treatment process that removes contaminants from the fluid by using pressure to force the fluid molecules through a semi-permeable membrane. The fluid that passes through the reverse osmosis filter membrane 22 is free of any minerals, while the contaminants trapped by the reverse osmosis filter membrane 22 can be flushed away during the next flushing cycle. The mineral free fluid (water) that has been mechanically processed is free of all dissolved solids. The reverse osmosis filter membrane 22 can vary in size, shape and configuration. One configuration for the reverse osmosis filter membrane 22 is a cylindrical configuration. Other geometrical shapes for the membrane 22, which are known to those skilled in the art, can also be used. Sometimes, two or more reverse osmosis filter membranes 22, 22 are connected together to handle a larger quantity of untreated fluid.

Two or more housings 18, 18 can be utilized in the filtering system 10. When two or more housings 18, 18 are present, they can be connected in series and/or in parallel. Each housing 18 will contain a reverse osmosis filter membrane 22. For example, if two housings 18, 18 are utilized, the two housings 18, 18 can be arranged side by side in a parallel arrangement. Alternatively, the two housings 18, 18 could be arranged in series. Up to eighteen housings 18 have been used in a large filtering system 10. In this arrangement, six housings 18 were arranged in parallel and each of the six housings 18 consisted of three housings 18 arranged in series.

The reverse osmosis filter membrane 22 can be a multi-layered media spun around an axis that can be used to filter dissolved solids from fluid (water) passing through it. The unique nature of a semi-permeable filter membrane 22 is that its ability to filter the untreated fluid is directly proportional to the pressure that is being applied to it. High pressure causes the reverse osmosis filter membrane 22 to compress, which in turn causes the pores of the membrane 22 to close. The closed pores of the semi-permeable membrane 22 allow only mineral free fluid to pass through. When the pressure is lowered, the reverse osmosis filter membrane 22 will relax and the pores of the membrane 22 will open (become larger in size). When the pores of the membrane 22 are enlarged, the trapped mineral particles can be flushed away. Failure of a reverse osmosis filter membrane 22 normally occurs from general wear of the membrane 22, due to fluid flow, or the inability of the membrane 22 to release trapped solids during the flushing process.

The mineral free fluid (water) which passes through the reverse osmosis filter membrane 22 is commonly referred to as "permeate". The production of permeate (mineral free fluid, such as water) using a reverse osmosis filter membrane 22 is similar too many filtering systems. However, the present invention differs in the way the reverse osmosis filter membrane 22 is flushed, by adding a "resorption" cycle and a "resorption flush" cycle. After the membrane 22 is cleaned, the filtering system 10 is again restarted to filter additional untreated fluid.

The housing 18 has an inlet side 24 and an outlet side 26. The reverse osmosis filter membrane 22 is positioned in the housing 18. The membrane 22 has an interior surface 28 and an exterior surface 30. The housing 18 has an inlet port 32 located outward of the exterior surface 30 of the membrane 22, at the inlet side 24 of the housing 18. The housing 18 also has a first outlet port 34 and a second outlet port 36 both located at the outlet side 26 of the housing 18. The first outlet port 34 is located outward of the exterior surface 30 of the membrane 22 and the second outlet port 36 is located inward of the interior surface 28 of the membrane 22.

The fluid system 10 also includes a storage tank 38 for holding permeate which is routed through a conduit from the second outlet port 36 of the housing 18. The storage tank 38 can vary in size, shape and configuration. Normally, the storage tank 38 has a cylindrical configuration. The storage tank 38 is sized to hold at least 100 gallons of permeate. Desirably, the storage tank 38 is sized to hold from between about 100 gallons to about 5,000 gallons of permeate. More desirably, the storage tank 38 could be sized to hold more than 5,000 gallons of permeate. Even more desirably, the storage tank 38 can be sized to hold from at least about 250 gallons of permeate. Most desirably, the storage tank 38 is sized to hold at least 300 gallons of permeate.

Still referring to FIG. 1, the fluid system 10 further includes a second pump 40. The second pump 40 is a low-pressure pump. By "low pressure" it is meant a pressure of less than about 75 psi. The second pump 40 serves two purposes. One purpose is to pump permeate to the housing 18 during the "flush" cycle and during the "resorption flush" cycle. This is done at a low pressure of less than about 20 psi. Desirably, the second pump 40 can pump permeate to the housing at a pressure ranging from between about 1 psi to about 15 psi. The second purpose of the second pump 40 is to route permeate to a desired function 42. The desired function 42 can be any function known to man. For example, a desired function 42 can be the equipment needed to wash a vehicle, such as at a commercial car wash. Another desired function 42 could be an industrial application. A third desired function 42 could be a commercial application.

The second pump 40 will route permeate to the desired function 42 at a somewhat higher pressure. Desirably, the second pump 40 can route permeate to the desired function 42 at a pressure ranging from between about 50 psi to about 85 psi. More desirably, the second pump 40 can route permeate to the desired function 42 at a pressure of less than 75 psi. Even more desirably, the second pump 40 can route permeate to the desired function 42 at a pressure from between about 55 psi to about 75 psi. Most desirably, the second pump 40 can route permeate to the desired function 42 at a pressure ranging from between about 60 psi to about 75 psi.

The second pump 40 is used to route low pressure permeate to the housing 18 when the first pump 16 is turned off. The second pump 40 is turned off when the first pump 16 is routing untreated fluid to the housing 18. The second pump 40 is also designed to route permeate through a conduit from the storage tank 38 to a desired function 42. This conduit can have a second control valve 44 positioned across it to control the flow of permeate.

Still referring to FIG. 1, the second pump 40 can route permeate through a conduit to the inlet side 24 of the housing 18 when the reverse osmosis filter membrane 22 is to be flushed. The first pump 16 is turned off during the flushing cycle. The conduit connects the second pump 40 to the inlet port 32 of the housing 18. This conduit has a third control valve 46 positioned across it to control the flow of permeate to the inlet port 32. A one-way check valve 48 is positioned across the conduit, downstream of the third control valve 46, to prevent backflow of permeate.

A unique feature of the present filtering system 10 is that the second pump 40 can route permeate simultaneously to both a desired function 42 and to the housing 18 to flush the reverse osmosis filter membrane 22.

Still referring to FIG. 1, the filtering system 10 further includes a conduit connected to the first outlet port 34 of the housing 18 which connects to a drain 52. This conduit route fluid containing minerals (dissolved solids) from the housing 18 to the drain 52 during the flushing process. A fourth control valve 50 is positioned across this conduit to control the flow of fluid therethrough. The fourth control valve 50 is closed during the filtering process. Another conduit is positioned between the conduit leading to the drain 52 and the conduit routing untreated fluid to the first pump 16. This conduit has a fifth control valve 54 positioned across it to control the flow of fluid containing minerals (dissolved solids) which is directed to the upstream side of the first pump 16 for re-processing.

It should be noted that during the filtering process, the first control valve 14 is open and the first pump 16 is turned on. The second pump 40 is turned off and the third control valve 46 is closed. The second control valve 44 is open and the fourth control vale 50 is closed. The pressure in the filtering system 10 can range from between about 100 psi to about 225 psi.

Figure 2:
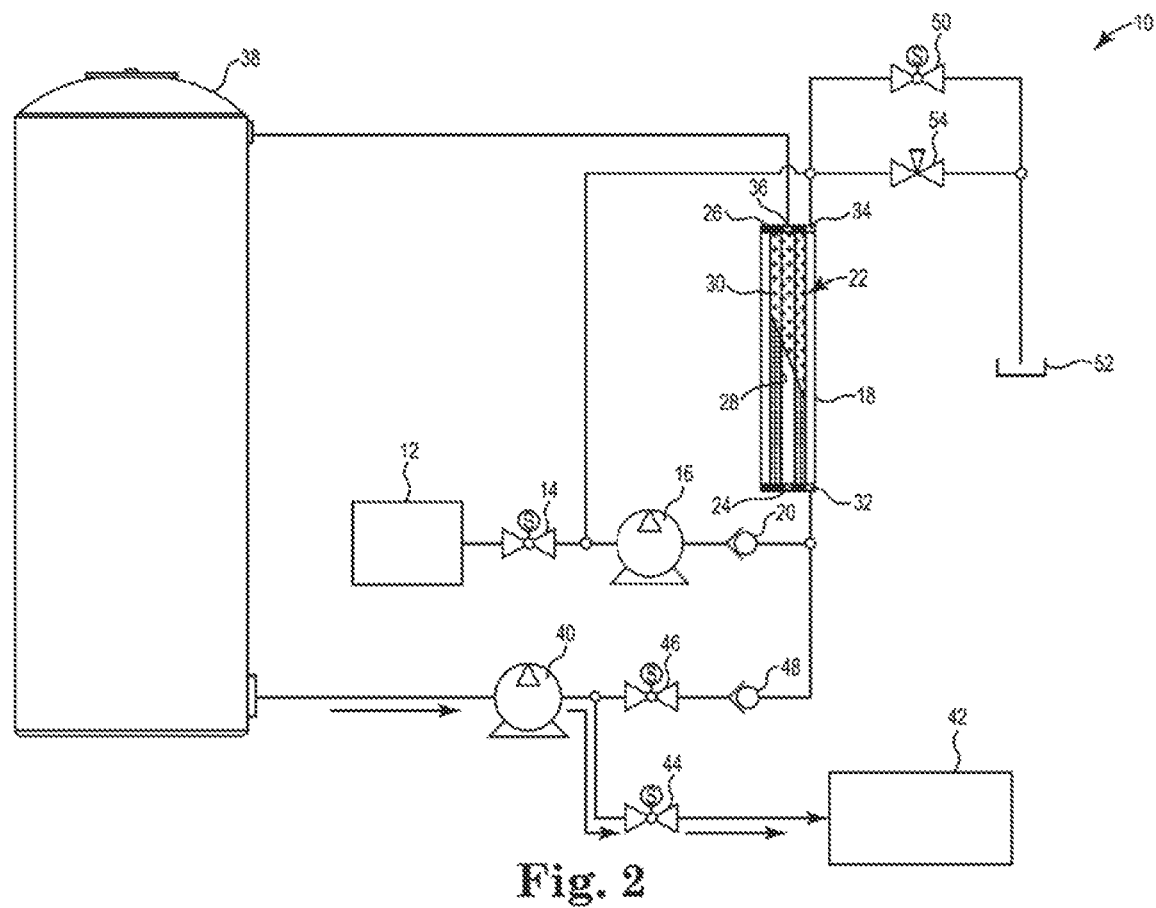
FIG. 2 is a schematic of the apparatus shown in FIG. 1 showing the delivery of permeate to a desired function, such as to car wash equipment.

Referring to FIG. 2, the filtering system 10 is depicted during delivery of permeate to a desired function 42. At this time, the first pump 16 is turned off and the second pump 40 is turned on. The third control valve 46 is closed and the second control valve 44 is open. This allows permeate to be pumped from the storage tank 38 via the second pump 40 through the conduit to the desired function 42. At this time, the fourth control valve 50 is closed since no fluid is exiting the housing 18.

Figure 3:
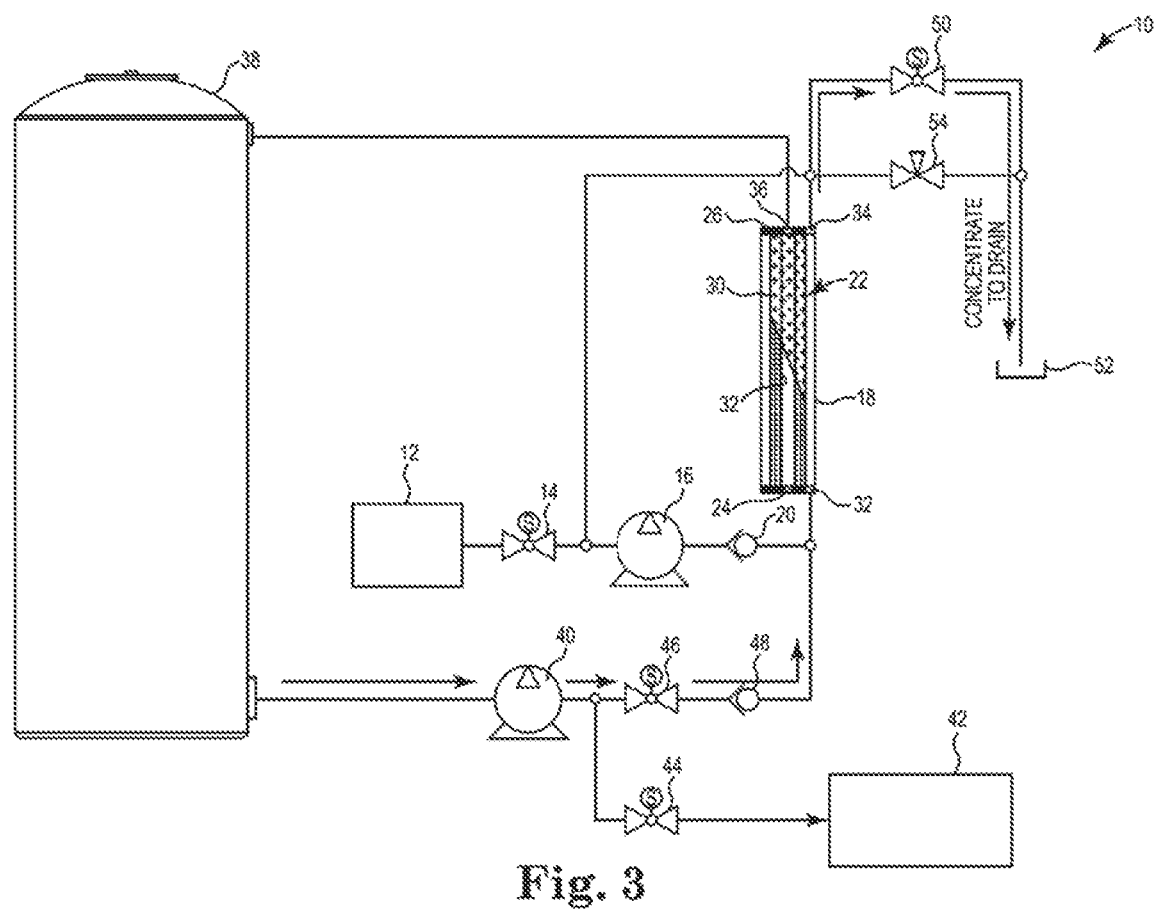
FIG. 3 is a schematic of the apparatus shown in FIG. 1 showing a flush cycle.

Referring to FIG. 3, the filtering system 10 is depicted during a flush cycle. At this time, the first control valve 14 is closed and the first pump 16 is turned off. The second pump 40 is turned on and the third control valve 46 is open. The second control valve 44 may be closed so that no permeate can be route to the desired function 42. Alternatively, as mentioned above, permeate can be simultaneously delivered to the desired function 42, if desired. Lastly, the fourth control valve 50 is open to allow fluid containing minerals to be routed to the drain 52. At this time, the pressure in the filtering system 10 ranges from between about 1 psi to about 15 psi. During this flush cycle, a portion of permeate passes adjacent to the exterior surface 30 of the reverse osmosis filter membrane 22 to flush heavy and loose solids from the membrane 22. This fluid, which contains minerals, is passed through the first outlet port 34 to the drain 52 via the conduit having the fourth control valve 50 positioned across it. The remaining portion of permeate passes back and forth through the reverse osmosis filter membrane 22 to flush the solids accumulated within the membrane 22 out through the first outlet port 34 to the drain 52 also via the conduit having the fourth control valve 50 positioned across it.

Figure 4:
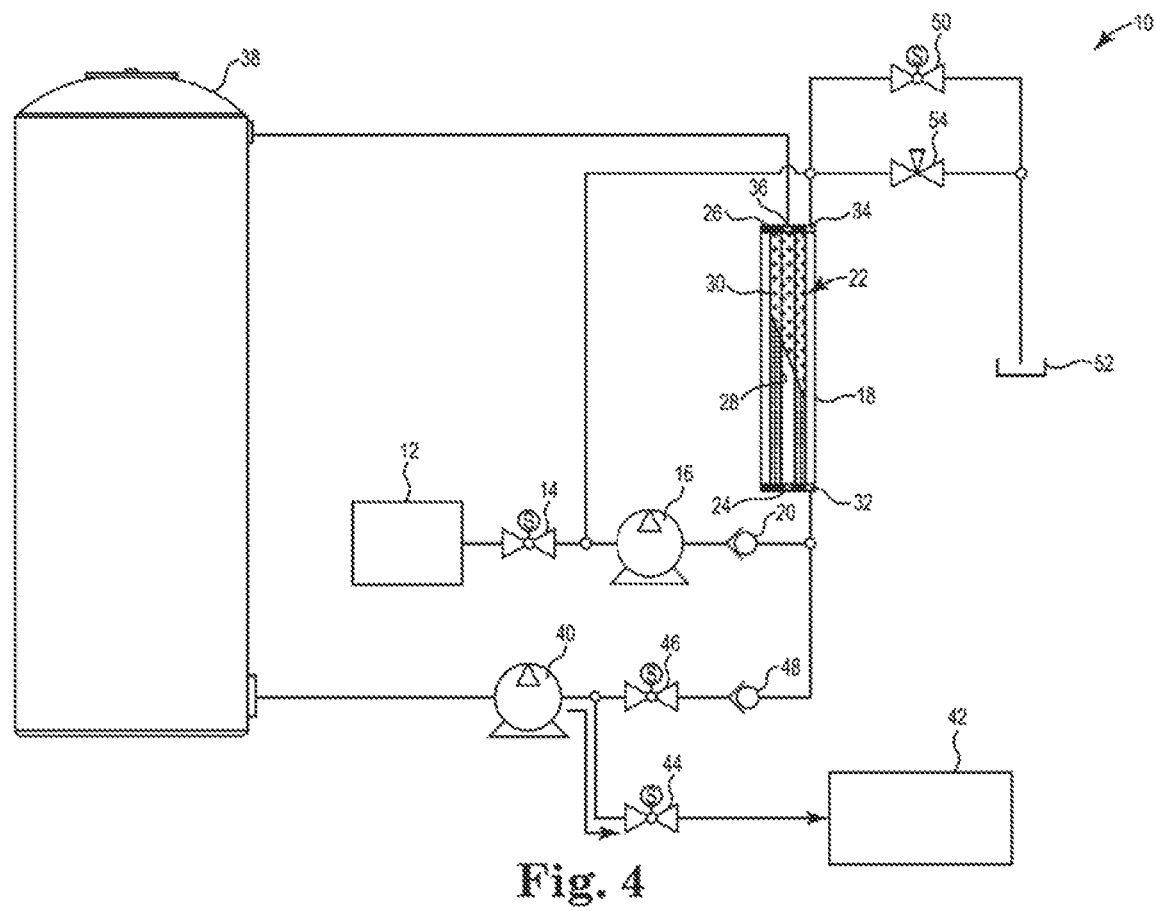
FIG. 4 is a schematic of the apparatus shown in FIG. 1 showing a "resorption" cycle.

Referring to FIG. 4, the filtering system 10 is depicted during a "resorption" cycle. At this time, the first control valve 14 is closed, and the first and second pumps, 16 and 40 respectively, are both turned off. The second, third and fourth control valves, 44, 46 and 50 are all closed and the pressure within the housing 18 is zero. The resorption cycle lasts for a period of time which is at least about 5 minutes. For larger filtering systems 10 or for filtering systems 10 which utilize more than one reverse osmosis filter membrane 22, the time of resorption can increase.

It should be noted that during the resorption cycle, if the second control valve 44 is open and the second pump 40 is turned on, pressurized permeate can be routed through the conduit leading to the desired function 42. This will normally occur at a low pressure from between about 1 psi to about 15 psi.

Figure 5:
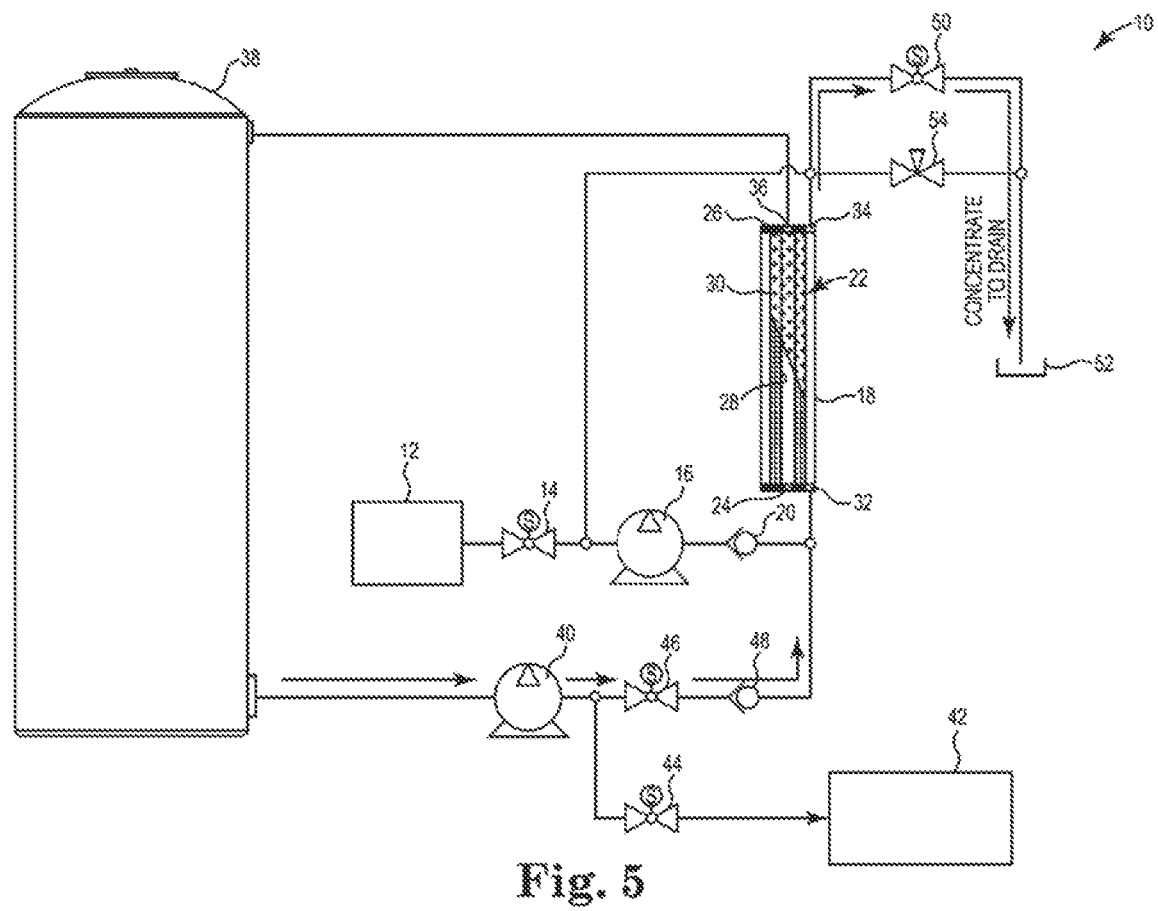
FIG. 5 is a schematic of the apparatus shown in FIG. 1 showing a "resorption flush" cycle.

Referring now to FIG. 5, the filtering system 10 is depicted during a "resorption flush" cycle. At this time, the first control valve 14 is closed and the first pump 16 is turned off. The second pump 40 is turned on and the third control valve 46 is open. The second control valve 44 is closed and the fourth control valve 50 is open. The second pump 40 will again pressurized permeate from between about 1 psi to about 15 psi. This low pressure will allow the reverse osmosis filter membrane 22 to remain relaxed with its pores open. This will allow the incoming permeate to flush any remaining permeate containing minerals (flush fluid) from the housing 18.

After the "resorption flush" cycle is completed, the second pump 40 is turned off and the flow of permeate through the reverse osmosis filter membrane 22 is stopped. The filtering system 10 returns to the set-up shown in FIG. 1. The first control valve 14 is opened, the first pump 16 is turned on and the second pump 40 is turned off. The third control valve 46 is closed, the second control valve 44 is opened, and the fourth control valve 50 is closed. In this scenario, additional untreated fluid from the fluid source 12 will be pressurized by the first pump 16 and be routed to the housing 18 where the reverse osmosis filter membrane 22 can again filter the incoming fluid.

This table shows eleven different filtering systems 10. Each utilizes a different number of reverse osmosis filter membranes 22. The diameter of the reverse osmosis filter membrane 22 varies from 4 inches to 8 inches. One can see that the total time needed to flush a system 10 and the amount of fluid used to flush the system will vary depending upon the size and parameters of the various filtering

TABLE 1

| | | | | | | | | |
|---|---|---|---|---|---|---|---|---|
| Permeate Flush - Processing Time | | | | | | | | |
| Model Number | Number of Membrane | Diameter of Membrane (inches) | Length of Membrane (inches) | Volume of Membrane | Percent by Volume for Membrane | Volume of Water per Membrane (Cu. in.) | Volume of Water per Membrane (Gallons) | Volume of Water Total (Gallons) |
| VROF-1 | 1 | 4 | 40 | 502.64 | 50.00% | 251.3 | 1.09 | 1.09 |
| VROF-2 | 2 | 4 | 40 | 502.64 | 50.00% | 251.3 | 1.09 | 2.18 |
| VROF-3 | 3 | 4 | 40 | 502.64 | 50.00% | 251.3 | 1.09 | 3.26 |
| VROF-4 | 4 | 4 | 40 | 502.64 | 50.00% | 251.3 | 1.09 | 4.35 |
| VROF-5 | 5 | 4 | 40 | 502.64 | 50.00% | 251.3 | 1.09 | 5.44 |
| VROF-6 | 6 | 4 | 40 | 502.64 | 50.00% | 251.3 | 1.09 | 6.53 |
| VROF-8 | 8 | 4 | 40 | 502.64 | 50.00% | 251.3 | 1.09 | 8.70 |
| VROF-9 | 9 | 4 | 40 | 502.64 | 50.00% | 251.3 | 1.09 | 9.79 |

TABLE 1-continued

| | | | Permeate Flush - Processing Time | | | | |
|---|---|---|---|---|---|---|---|
| VROF-12 | 12 | 4 | 40 | 502.64 | 50.00% | 251.3 | 1.09 | 13.06 |
| VROF-18 | 18 | 4 | 40 | 502.64 | 50.00% | 251.3 | 1.09 | 19.58 |
| VROF-48 | 4 | 8 | 40 | 2010.56 | 50.00% | 1005.3 | 4.35 | 17.41 |

| Model Number | Permeate Pump Volume (GPM) | Time to Fill at Pump Volume (Minutes) | Minimum Flush Time (Minutes) | Mechanical Flush Time (Minutes) | Minimum Resorption Time * (Minutes) | Resorption Flush Time (Minutes) | Total Time To Flush * (Minutes) | Water Used To Flush (Gallons) |
|---|---|---|---|---|---|---|---|---|
| VROF-1 | 15.0 | 0.07 | 3 | 3.07 | 5 | 0.08 | 8.15 | 47.28 |
| VROF-2 | 15.0 | 0.15 | 3 | 3.15 | 5 | 0.16 | 8.30 | 49.57 |
| VROF-3 | 15.0 | 0.22 | 3 | 3.22 | 5 | 0.24 | 8.46 | 51.85 |
| VROF-4 | 15.0 | 0.29 | 3 | 3.29 | 5 | 0.32 | 8.61 | 54.14 |
| VROF-5 | 15.0 | 0.36 | 3 | 3.36 | 5 | 0.40 | 8.76 | 56.42 |
| VROF-6 | 15.0 | 0.44 | 3 | 3.44 | 5 | 0.48 | 8.91 | 58.71 |
| VROF-8 | 15.0 | 0.58 | 3 | 3.58 | 5 | 0.64 | 9.22 | 63.28 |
| VROF-9 | 15.0 | 0.65 | 3 | 3.66 | 5 | 0.72 | 9.37 | 65.56 |
| VROF-12 | 15.0 | 0.87 | 3 | 3.87 | 5 | 0.96 | 9.83 | 72.42 |
| VROF-18 | 15.0 | 1.31 | 3 | 4.31 | 5 | 1.44 | 10.74 | 86.13 |
| VROF-48 | 15.0 | 1.16 | 3 | 4.16 | 5 | 1.28 | 10.44 | 81.56 |

* Time can increase to allow for extended resorption of heavier solids attached to membrane.

Figure 6:
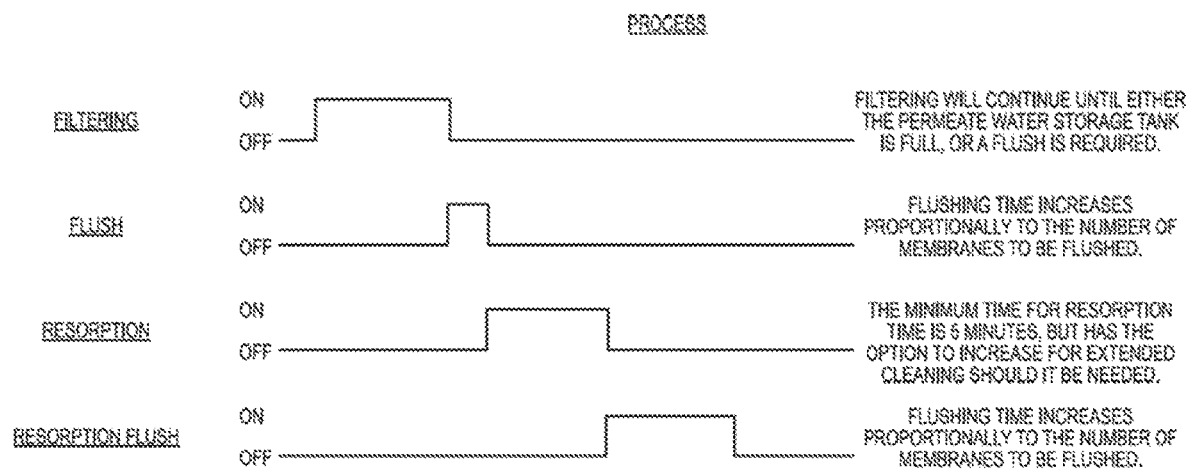
FIG. 6 is a schematic showing a filtering cycle, a flush cycle, a "resorption" cycle and a "resorption flush" cycle.

Referring now to FIG. 6, a schematic is shown for the filtering, flush, "resorption" and "resorption flush" cycles. The filtering cycle will continue until either the storage tank 38 is full or a flush is required. The flush cycle will continue for 3 minutes unless the number of reverse osmosis filter membranes 22, 22 is greater than one. Then the time for the flushing cycle can increase proportionally to the number of membranes 22, 22 that need to be flushed. The minimum time required for the "resorption" cycle is 5 minutes. However, one has the option to increase this time for additional cleaning of the membrane 22, should it be needed. Lastly, the "resorption flush" cycle time increases proportionally to the number of reverse osmosis filter membranes 22, 22 that need to be flushed.

Figure 7:
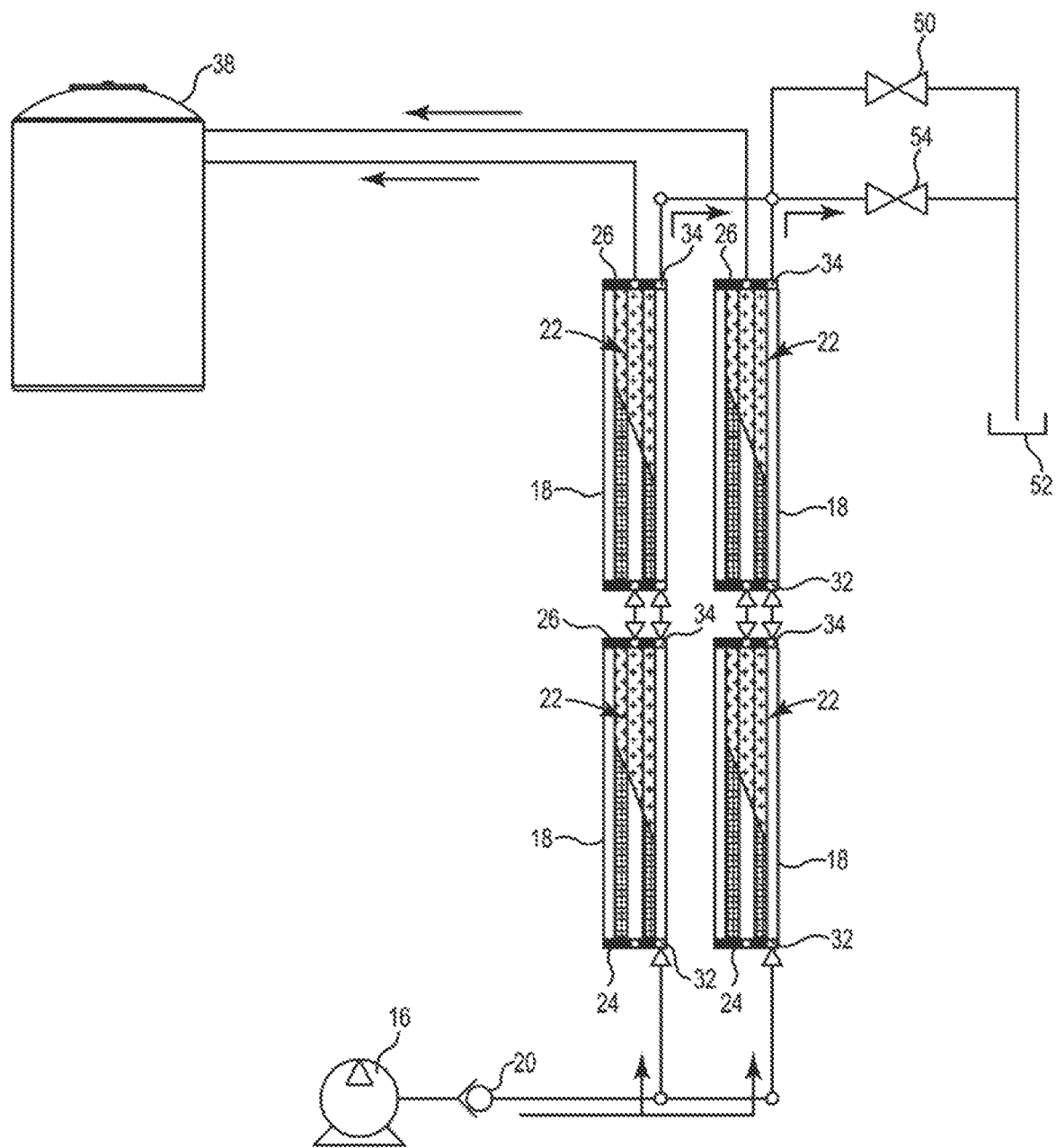
FIG. 7 is a partial schematic of the apparatus shown in FIG. 1 depicting the use of four filter housings, two connected in series and two connected in parallel.

Referring now to FIG. 7, a partial schematic is shown which is similar to FIG. 1 except that instead of using a single housing 18, four housings 18, 18, 18 and 18 are utilized. Each housing 18 contains a reverse osmosis filter membrane 22. Two of the housings 18, 18 are connected in series and two of the housings 18, 18 are connected in parallel. When the amount of untreated fluid which has to be filtered is large and/or the untreated fluid contains a high quantity of minerals, two or more housings 18, 18 can be employed. When two housings 18, 18 are employed, they can be arranged in series or in parallel. Either arrangement can be used depending on available space, system size, amount of untreated fluid that needs to be filtered, etc. It should be understood that multiple housings 18 can be employed and they can be arranged in series and/or in parallel. For example, nine housings 18 can be utilized, three arranged in series and three arranged in parallel. The present of two or more housings 18, 18, each containing a reverse osmosis filter membrane 22, will efficiently filter the incoming untreated fluid.

Method

A method of using permeate to flush a reverse osmosis filter membrane 22 in the same direction of flow as when untreated fluid is being filtered by the membrane 22 will now be discussed. The method includes the steps of routing pressurized, untreated fluid from a fluid source 12 to a housing 18 having a reverse osmosis filter membrane 22 positioned therein. The untreated fluid is pressurized to at least about 100 psi. The membrane 22 has an inlet side 24 and an outlet side 26. The membrane 22 can have almost any geometrical configuration but a hollow cylindrical configuration works well. The membrane 22 also has an interior surface 28 and an exterior surface 30. The housing 18 has an inlet port 32 located outward of the exterior surface 30 of the membrane 22 at the inlet side 24 of the housing 18, and a first outlet port 34 and a second outlet port 36 both located at the outlet side 26 of the housing 18. The first outlet port 34 is located outward of the exterior surface 30 of the membrane 22 and the second outlet port 36 is located inward of the interior surface 28 of the membrane 22. The untreated fluid passes through the membrane 22 positioned in the housing 18 to produce permeate (mineral free fluid). The method also includes routing permeate through the first outlet port 34 to a storage tank 38. The storage tank 38 will hold permeate until it is needed by a desired function 42, such as car wash equipment. The storage tank 38 also serves as the reservoir for permeate needed during the "flush" cycle and during the "resorption flush" cycle of the reverse osmosis filter membrane 22.

The method further includes stopping the flow of the untreated fluid to the housing 18 when the storage tank 38 is full or nearly full, or if it is time to flush the membrane 22. At this time, permeate from the storage tank 38 is routed via a conduit to the inlet port 32 of the housing 18. Permeate enters the housing 18 at a low pressure, from about 1 psi to about 15 psi. This low pressure allows the reverse osmosis filter membrane 22 to relax, which in turn allows the pores of the membrane 22 to return to their original size. The pores are now large enough to allow permeate together with any minerals or dissolved solids removed from the membrane 22 to flow back and forth through them. Some of the permeate will flow along the exterior surface 30 of the membrane 22 to remove heavy and/or loose minerals (dissolved solids) which have adhered to the exterior surface 30 of the membrane 22. The remainder of permeate will pass through the membrane 22 to flush the membrane 22. As the membrane 22 is flushed, permeate will pick up minerals and dissolved solids which were trapped within the membrane 22 to produce a "flush fluid" which contains minerals. This "flush fluid" can pass back and forth through the membrane 22 since the pores of the membrane 22 have increased in size.

This "flush fluid" is then routed out through the second outlet port 36 via a conduit to the drain 52.

At this time, the second pump 40 is turned off and any fluid present in the housing 18 will immerse the reverse osmosis filter membrane 22. This fluid is at zero pressure and will simply stay within the housing. This process is referred to as "resorption". During "resorption", the ion hungry fluid will act as a cleaning agent by resorbing the minerals attached to the membrane 22. This resorption cycle take at least about 5 minutes but the time could be extended is more than one reverse osmosis filter membrane 22 is present. All of the fluid within the housing 18 will now be "flush fluid" since it has resorbed minerals and dissolved solids from the membrane 22.

A "resorption flush" cycle will then occur to route the "flush fluid" out of the housing 18. This happens once the second pump is turned on. The second pump 40 will direct additional permeate through the reverse osmosis filter membrane 22 at a low pressure from between about 1 psi to about 15 psi. The "flush fluid" is routed out of the first outlet port 34 and through a conduit to the drain 52. This means that only permeate is left in the housing 18. The second pump 40 is then turned off and the first pump 16 is turned on. The filtering system 10 is now back to the filtering cycle where untreated fluid at a pressure of at least about 100 psi will be routed through the reverse osmosis filter membrane 22 to make permeate.

The "resorption flush" cycle of this invention is very unique. The "resorption flush" cycle creates an extra level of cleaning of the membrane 22. It occurs after the "resorption" cycle. The "resorption flush" cycle extends the life of the membrane 22 and increases its operational efficiency. This is accomplished by the use of permeate (mineral free fluid) already processed by the filtering system 10. Instead of using untreated fluid, which is high in total dissolved solids (TDS), and which are used by many reverse osmosis filter flushing systems, the permeate (mineral free fluid) is ion hungry. The ion hungry permeate easily accepts minerals while it works to flush out the membrane 22. This enhancement helps dislodge and/or dissolve any minerals that may not have been flushed out at the flushing cycle. Total dissolved solids (TDS) refer to a value associated with any minerals, salts, metals, cations or anions dissolved in a fluid. Total dissolved solids (TDS) comprise inorganic salts (principally calcium, magnesium, potassium, sodium, bicarbonates, chlorides, and sulfates) and some small amounts of organic matter that are dissolved in the fluid.

The method further includes the step of using a first control valve 14, located upstream of the first pump 16, to control the flow of untreated fluid to the first pump 16, and using a third control valve 46, located downstream of the second pump 40, to control the flow of permeate from the second pump 40 to the inlet port 32.

The method further includes the step of using a fourth control valve 50, located downstream of the reverse osmosis filter membrane 22, to control removal of the flush fluid from the first outlet port 34.

The method further includes the step of stopping the flow of permeate to the reverse osmosis filter membrane 22 and restarting the first pump 16 to route untreated fluid to the membrane 22 where it can be filtered.

A more specific method of using permeate to flush a reverse osmosis filter membrane 22 in the same direction of flow as when the untreated fluid is being filtered by the membrane 22 includes the steps of routing pressurized, untreated fluid through a housing 18 having a reverse osmosis filter membrane 22 positioned therein. The housing 18 has an inlet side 24 and an outlet side 26. The membrane 22 has an interior surface 28 and an exterior surface 30. The housing 18 has an inlet port 32, located outward of the exterior surface 30 of the membrane 22, at the inlet side 24 of the housing 22, and a first outlet port 34 and a second outlet port 36 both located at the outlet side 26 of the housing 18. The first outlet port 34 is located outward of the exterior surface 30 of the membrane 22 and the second outlet port 36 is located inward of the interior surface 28 of the membrane 22. The pressurized, untreated fluid passes through the membrane 22 to produce permeate.

The method also includes routing permeate through the second outlet port 36 to a storage tank 38. The storage tank 38 is capable of holding from between 100 gallons to 5,000 gallons of permeate or more. The flow of the untreated fluid to the housing 22 is then stopped by turning off the first pump 16 when it is time to flush the membrane 22. Permeate from the storage tank 38 is then routed to the inlet port 32 of the housing 22, at a low pressure, when the second pump 40 is turned on. Some permeate will pass along the exterior surface 30 of the membrane 22 to remove solids and the remaining permeate will pass through the membrane 22 to flush the membrane 22. Permeate now contains minerals and solids and is referred to as "flush fluid". This "flush fluid" is then routed from the first outlet port 34 via the conduit to the drain 52.

The method further includes a "resorption" cycle wherein the membrane 22 is immersed in permeate for at least about 5 minutes at zero pressure. Desirably, the membrane 22 is immersed in permeate for longer than 5 minutes at zero pressure. During the "resorption" cycle, permeate will resorb solids from the membrane 22 and form additional "flush fluid". At this point, the second pump 40 is turned on again and additional permeate is routed into the housing to flush the remaining "flush fluid" out of the housing 18. This is called the "resorption flush" cycle. During the "resorption flush" cycle, permeate is routed through the membrane 22 at a low pressure from between about 1 psi to about 15 psi. The "flush fluid" is pushed out of the housing 18 by the incoming permeate. The "flush Fluid" is routed through the first outlet port 32 and via the conduit to the drain 52.

The method also uses a control valve 46, located downstream of the second pump 40, to control removal of permeate through the second pump 40. The method further includes using a pressure control valve 54, located before the drain 52, for rerouting at least some of the "flush fluid" to an upstream side of the first pump 16 for re-processing. The method also includes using the first pump 16 to pressurize the untreated fluid and routing this fluid to the inlet side 24 of the membrane 22.

The method further includes simultaneously passing the permeate through the membrane 22 to flush the membrane 22 while passing additional permeate from the second pump 40 to the desired function 42.

It should be understood that the use of permeate (mineral free fluid) to flush trapped solids from a semi permeable membrane 22 in a reverse osmosis filtering system 10 can both improve potential cleaning though the resorption of trapped minerals and eliminate the platting effects caused by the introduction of orthophosphate into the fresh fluid supply. It is believed that by using permeate in the flush cycle, one eliminates the possibility of getting any contamination into the storage tank 38. It is also believed that the use of permeated (mineral free fluid) to flush the semi-permeable membrane 22 both improves the efficiency of the operation and extends the expected life of the membrane 22 by providing a more complete cleaning.

While the invention has been described in conjunction with several specific embodiments, it is to be understood that many alternatives. Modifications and variations will be apparent to those skilled in the art in light of the foregoing description. Accordingly, this invention is intended to embrace all such alternatives, modifications and variations which fall within the spirit and scope of the appended claims.

The invention claimed is:

1. A method of using permeate to flush a reverse osmosis filter membrane in the same direction of flow as when fluid is being filtered by said membrane, the method comprising the steps of:
   a) routing pressurized fluid through a housing having a reverse osmosis filter membrane positioned therein to form permeate;
   b) routing said permeate to a storage tank;
   c) stopping the flow of said fluid to said housing;
   d) routing permeate from said storage tank to said housing and through said membrane to flush said membrane;
   e) stopping the flow of said permeate to said housing and allowing said permeate present in said housing to immerse said membrane for at least about 5 minutes to resorb solids from said membrane and form a flush fluid; and
   f) restarting the flow of permeate from said tank to said housing and flushing said flush fluid out of said housing with permeate from said tank.

2. The method of claim 1, further comprising using a first pump to route said fluid to said housing and using a second pump to route said permeate to said housing.

3. The method of claim 1, wherein said fluid is routed through said membrane at a pressure of at least about 100 psi, and said storage tank can hold from between about 100 gallons to about 5,000 gallons of permeate.

4. The method of claim 1, wherein said permeate is routed through said membrane at a pressure from between about 1 psi to about 15 psi to flush said membrane.

5. The method of claim 2, further comprising using a control valve located upstream of said first pump to control flow of fluid to said first pump, and using a control valve located downstream of said second pump to control flow of permeate from said second pump to said housing.

6. The method of claim 1, further comprising immersing said membrane in permeate at zero pressure for longer than 5 minutes.

7. The method of claim 1, further comprising using at least two housings, each containing a reverse osmosis filter membrane, and said two housings are arranged in either series or in parallel, and said storage tank is sized to hold from between about 100 gallons to about 5,000 gallons of permeate.

8. A method of using permeate to flush a reverse osmosis filter membrane in the same direction of flow as when fluid is being filtered by said membrane, the method comprising the steps of:
   a) routing pressurized fluid through a housing having a reverse osmosis filter membrane positioned therein and having an inlet side and an outlet side, said membrane having an interior surface and an exterior surface, said housing having an inlet port located outward of said exterior surface of said membrane at said inlet side of said housing, and a first outlet port and a second outlet port both located at said outlet side of said housing, said first outlet port located outward of said exterior surface of said membrane and said second outlet port located inward of said interior surface of said membrane, said untreated fluid passing through said membrane to produce permeate;
   b) routing said permeate through said first outlet port to a storage tank, said storage tank holding from between 100 gallons to 5,000 gallons of permeate;
   c) stopping the flow of said untreated fluid to said housing;
   d) routing permeate from said storage tank to said inlet port of said housing and passing said permeate along said exterior surface of said membrane to remove solids and passing the remainder of said permeate through said membrane to flush said membrane, said permeate now containing solids producing a flush fluid;
   e) routing said flush fluid to a drain through said first outlet port;
   f) allowing said permeate to immerse said membrane for at least about 5 minutes at zero pressure to resorb solids from said membrane and form additional flush fluid; and
   g) flushing said additional flush fluid out of said housing and through said first outlet port to said drain using additional permeate.

9. The method of claim 8, further comprising using a control valve located downstream of said second pump to control removal of said permeate through said second pump.

10. The method of claim 8, further comprising using a pressure control valve located before said drain for rerouting at least some of said flush fluid to an upstream side of said first pump.

11. The method of claim 8, further comprising pressurizing said fluid passing through said first pump and routing said pressurized fluid to said inlet side of said membrane.

12. The method of claim 8, further comprising stopping flow of said fluid to said inlet side of said membrane and passing said permeate through said membrane from said inlet side to said outlet side.

13. The method of claim 8, further comprising simultaneously passing said permeate through said membrane while passing additional permeate from said second pump to said desired function.

14. The method of claim 1, wherein the permeate is routed through the membrane under pressure from a pump.

* * * * *